US008175434B2

(12) United States Patent
Davidson et al.

(10) Patent No.: US 8,175,434 B2
(45) Date of Patent: May 8, 2012

(54) ALL-DIELECTRIC SELF-SUPPORTING CABLE HAVING HIGH FIBER COUNT (75) Inventors: Grant M. Davidson, Irmo, SC (US); William E. Wolfe, Chapin, SC (US); Ben H. Wells, Columbia, SC (US)

(73) Assignee: Prysmian Communication Cables and Systems USA, LLC, Lexington, SC (US)

( * ) Notice: Subject to any disclaimer, the term of this patent is extended or adjusted under 35 U.S.C. 154(b) by 0 days.

(21) Appl. No.: 12/085,517

(22) PCT Filed: Dec. 23, 2005

(86) PCT No.: PCT/US2005/047177
§ 371 (c)(1),
(2), (4) Date: Aug. 17, 2009

(87) PCT Pub. No.: WO2007/073386
PCT Pub. Date: Jun. 28, 2007

(65) Prior Publication Data
US 2009/0304338 A1    Dec. 10, 2009

(51) Int. Cl.
*G02B 6/44* (2006.01)
*G02B 6/04* (2006.01)
(52) U.S. Cl. ......................................... 385/113; 385/115
(58) Field of Classification Search ........... 385/110–115
See application file for complete search history.

(56) References Cited

U.S. PATENT DOCUMENTS

| | | | |
|---|---|---|---|
| 5,230,034 A | | 7/1993 | Bottoms, Jr. et al. |
| 5,268,971 A | * | 12/1993 | Nilsson et al. ................ 385/101 |
| 5,325,457 A | | 6/1994 | Bottoms, Jr. et al. |
| 5,345,526 A | * | 9/1994 | Blew .............................. 385/112 |
| 6,185,351 B1 | | 2/2001 | Daneshvar et al. |
| 6,278,825 B1 | | 8/2001 | Casiraghi et al. |
| 6,487,346 B2 | * | 11/2002 | Nothofer ....................... 385/109 |
| 6,658,185 B2 | | 12/2003 | Bosisio et al. |
| 2001/0021296 A1 | | 9/2001 | Nothofer |
| 2003/0059182 A1 | | 3/2003 | Johnson et al. |
| 2003/0118300 A1 | * | 6/2003 | Seddon et al. ................ 385/111 |
| 2005/0196113 A1 | * | 9/2005 | Hurley et al. ................. 385/109 |
| 2005/0244155 A1 | | 11/2005 | Bocanegra et al. |

FOREIGN PATENT DOCUMENTS

EP    1 591 814  A1    11/2005

(Continued)

OTHER PUBLICATIONS

Alcoa, AFL Telecommunications, "Fiber Optic Cable, ADSS Transmission Design", www.AFLtele.com pp. 32-35, (2004).

(Continued)

*Primary Examiner* — Eric Wong
(74) *Attorney, Agent, or Firm* — Finnegan, Henderson, Farabow, Garrett & Dunner, L.L.P.

(57) ABSTRACT

An all-dielectric self-supporting optical fiber cable utilizes a single layer reverse oscillated lay (ROL) design and includes a fiber count of more than 288 fibers. By arranging buffer tubes in a single layer, the ADSS cable effectively isolates the tensile and thermo strain of the cable in central and outer strength members, thus preventing strain from aerial installation from impairing or otherwise inversely impacting the performance of the optical fibers. Moreover, fibers are loosely housed in bundles to permit fiber movement and further prevent strain on the fibers.

15 Claims, 5 Drawing Sheets

FOREIGN PATENT DOCUMENTS

| | | |
|---|---|---|
| WO | WO-2004/074899 A1 | 9/2004 |
| WO | WO-2005/022230 A1 | 3/2005 |

OTHER PUBLICATIONS

Alcoa, AFL Telecommunications, "Fiber Optic Cable, ADSS Medium Design", www.AFLtele.com, pp. 28-31, (2004).

OFS, Leading Optical Innovations, "Power Guide. Loose Tube Fiber Optic Cables", 8 pages, (2004).

BundleLink, "Bundled Fiber, Stranded Tube Cable for Aerial, Duct and Direct-Buried Applications", Pirelli Communications Cables and Systems North America, 2 pages, (2004).

AeroLink, Short Span ADSS, "All-Dielectric Self-Supporting Cable for Aerial Applications", Pirelli Communications Cables and Systems North America, 2 pages, (2004).

AeroLink, Medium Span ADSS, "All-Dielectric Self-Supporting Cable for Aerial Applications", Pirelli Communications Cables and Systems North America, 2 pages, (2004).

AeroLink Long Span ADSS, "All-Dielectric Self-Supporting Cable for Aerial Applications", Pirelli Communications Cables and Systems North America, 2 pages, (2004).

MassLink, "Ribbon Stranded Loose Tube Cable for Aerial", Duct and Direct-Buried Applications, Pirelli Communications Cables and Systems North America, 2 pages, (2004).

\* cited by examiner

ALL-DIELECTRIC SELF-SUPPORTING CABLE HAVING HIGH FIBER COUNT

CROSS REFERENCE TO RELATED APPLICATION

This application is a national phase application based on PCT/US2005/047177, filed Dec. 23, 2005, the content of which is incorporated herein by reference.

TECHNICAL FIELD

The technical field of this invention is all-dielectric self-supporting (ADSS) cables that contain optical fibers. More specifically, the field of this invention relates to ADSS cables that contain more than 288 optical fibers.

BACKGROUND

Communication cables that include optical fibers have been deployed in many types of installations. For example, fiber optic cables are often installed underground, either by burying them directly or by blowing them through ducts. Another installation option has been to string the cables aerially between poles, as with traditional telephone lines.

Of these methods, aerial installation has gained popularity. It costs less to deploy cables above ground than below ground, and aerial installation makes the fiber optic cable easier to access for maintenance or repair. Moreover, cables installed above ground tend to be less susceptible to damage, which may happen to cables installed in ground by unintentional excavation.

While optical fiber cables are typically installed aerially by suspending them between poles, this technique applies stresses to the cable that cables in other installations do not face. For instance, aerial installation imparts substantial tensile stresses on the cable caused by the weight of the cable suspended between poles. Wind, snow, and ice can increase these stresses. Exposure to the environment also can subject the cable to thermo stresses from the climate. The tensile and thermo stresses can increase attenuation in the optical fibers, adversely impacting their performance as a communication medium. Lashing the cable to suspension wires may decrease tensile stresses, but it introduces other problems. Namely, suspension wires significantly increase the cost of installation and, as conductors, may attract lightning. Lightning strikes can seriously damage the fiber optic cable.

In short, fiber optic cables installed aerially need to withstand the increased stresses that arise from suspension and need to avoid attracting lightning strikes. Conventional cables of this type are typically of the loose-tube design, where the fibers are housed in a plurality of buffer tubes stranded around a central strength member. The loose-tube design permits the fibers to move within the buffer tubes and avoid absorbing stress or strain on the cable. Moreover, the materials in the cable are exclusively dielectric to avoid lightning and allowing the cable to be placed in the power region of the pole. The cables are, therefore, called all-dielectric, self-supporting (ADSS) cables.

ADSS cables are designed to reduce stresses on the optical fibers. Fiber strain is a loss mechanism in optical fibers that may occur if the cable is subjected to tensile forces, either from installation or temperature, or compression forces. Fiber strain may cause signal loss in the optical fibers. A central strength member and usually outer strength members are included in ADSS cables to help bear the tensile and thermo stresses. Also, the optical fibers often have excess length so that they may move freely within the buffer tubes.

Figure 1:
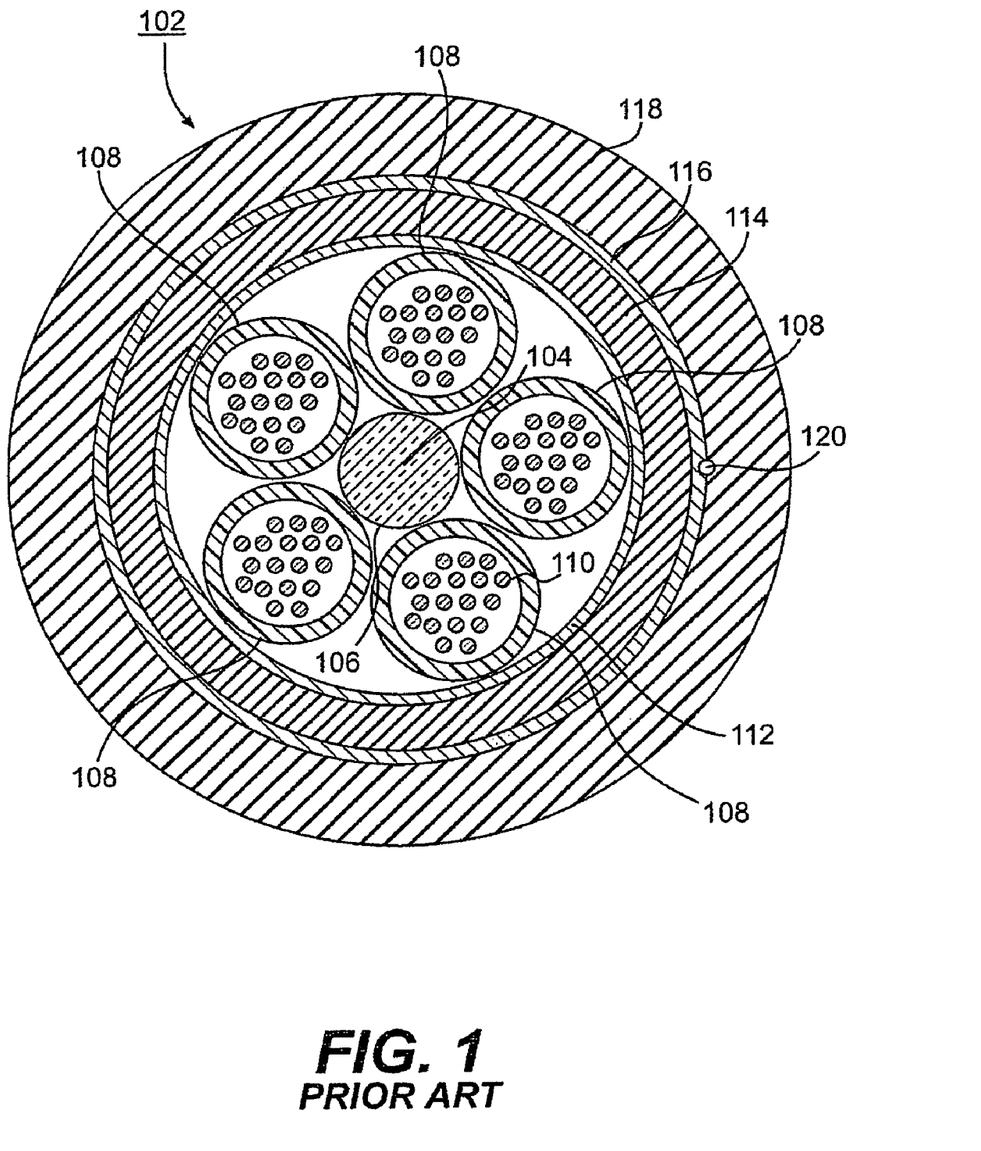
FIG. 1 is a cross-sectional diagram of a conventional ADSS cable.

FIG. 1 shows a generalized cross-sectional view of a typical ADSS cable 102. ADSS cable 102 includes, at its core, a central strength member 104, which is capable of withstanding and controlling the significant tensile and thermo stresses that the ADSS cable may be subject to. Typically, central strength member 104 may be made from glass-fiber reinforced plastic. Central strength member 104 may have a jacket or coating 106 of polymeric material, such as, for example, a polyolefin or polyethylene coating.

A plurality of buffer tubes 108 surrounds central strength member 104. Each buffer tube 108 includes a plurality of optical fibers 110 within it. A gel-based filling material may be introduced inside buffer tube 108 to serve as a physical barrier to any water accidentally penetrated inside buffer tube 108. A water-swellable tape 112, an inner jacket 114 which is used to isolate the optical core, and outer strength members 116 respectively surround buffer tubes 108. An outer jacket 118 protects the exterior of the cable. A rip cord 120 provides a means for easily opening the cable jacket to access the fibers during installation or repair.

Known ADSS cables having the structure of FIG. 1 have had a maximum capacity of 288 fibers. Conventional ADSS cables with higher fiber counts have followed one of two alternative approaches.

Figure 2:
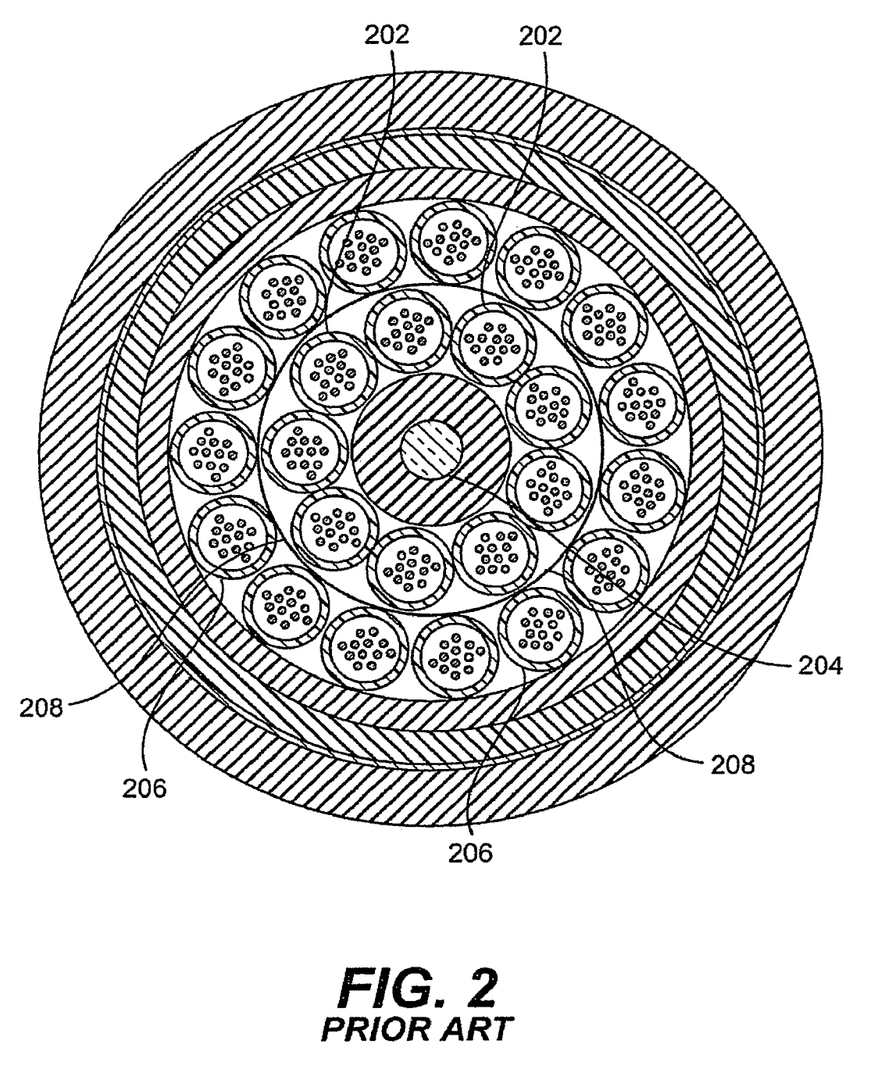
FIG. 2 is a cross-sectional diagram of a conventional ADSS cable having two layers of buffer tubes.

In one design, shown in FIG. 2, a second layer of buffer tubes is added around the first layer. In this two-layered design, a first or inner layer of buffer tubes 202 is directly in contact with or stranded to central strength member 204, similar to the design in FIG. 1. To increase the fiber count, a second or outer layer of buffer tubes 206 is placed over and secured to the first or inner layer of buffer tubes 202. The buffer tubes in the second layer have substantially the same dimensions as the tubes in the first layer. A water blocking or swellable tape 208 may be inserted between the two layers 202 and 206. Other features of the two-layered design may be similar to those of the ADSS cable of FIG. 1.

In another design, loose fibers in the conventional ADSS cable of FIG. 1 are replaced with ribbon fibers. Optical fiber ribbons are planar arrays of fibers that are bonded together as a unit. Through bonding, ribbons provide a higher density of fibers per unit area. Ribbons can advantageously be mass fusion spliced, saving setup and maintenance costs. Consequently, for the same cable structure, an ADSS cable can generally provide a higher number of fibers using ribbons rather than loose or bundled fibers.

Figure 3:
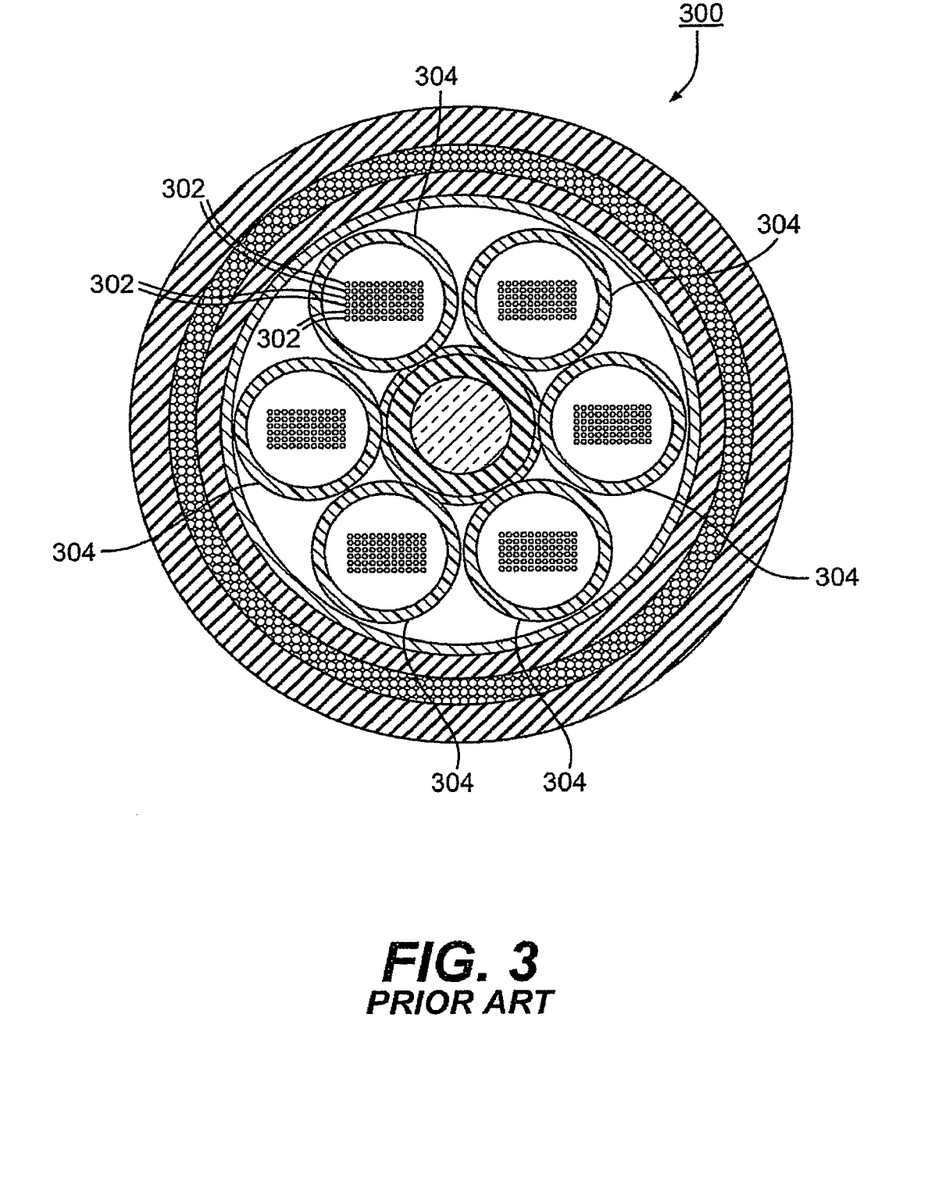
FIG. 3 is cross-sectional diagram of a conventional ADSS cable having fiber ribbon stacks within the buffer tubes.

U.S. Pat. No. 6,185,351 describes an ADSS cable using ribbon fibers. FIG. 3 reproduces a cross-sectional view of the cable from the '351 patent. As shown in FIG. 3, stacks of ribbon fibers 302 are encased in six buffer tubes 304 in cable 300, leading to a total fiber count in excess of 288. Depending on the fiber count, the ribbon stacks 302 in cable 300 may be rectangular or square in shape. The ribbon stacks 302 are generally twisted into a helix to help maintain the stack form. Generally, the optical fibers of the ribbon stacks 302 are held together using an ultraviolet-curable matrix bonding material or other suitable boding material.

Applicants have noted that the known attempts for an ADSS cable having a fiber count in excess of 288 have several disadvantages. The two-layer design of FIG. 2, for example, exposes the optical fibers to excessive stress in an aerial installation. Specifically, being in immediate contact with central strength member 204, the first layer of buffer tubes 202 is generally well protected from tensile and thermo stresses from the environment. In static applications, such as in directly buried or duct applications, where straining of the cable is minimum, the second layer of buffer tubes 206 may also be adequately protected. However, the inner layer of buffer tubes can become decoupled from the outer layer and cause problems either immediately after installation or over time. Moreover, ADSS cables in aerial installations are subject to significant Aeolian vibration, direct exposure to hostile environmental conditions, and other conditions that create substantial tension and strain on the cable. In such strained conditions, there is less control over the expansion and/or contraction of the second layer of buffer tubes 206.

Additionally, securing a second layer of buffer tubes to an inner layer of buffer tubes causes extra stress and tension to be exerted on the inner layer of buffer tubes. Because an ADSS cable must carry the weight and installation tensions of the cable itself as well as the external loads created by the effects of wind and ice, the added stress from a second layer of buffer tubes is undesirable and may cause data attenuation and other unpredictable irregularities in the fibers in the inner layer of buffer tubes.

The design 300 using optical fiber ribbons also has several disadvantages. The fibers located at the corners of the stack may be subject to flexural stresses and may encounter friction from rubbing against the inner buffer tube walls. This may result in some unpredictable variations in attenuation in the corner fibers. One way to minimize this unpredictable attenuation of the corner fibers is to select corner fibers based on mode field diameter and cutoff wavelength. However, such selection is merely a way to minimize the impact of the problem associated with using ribbon stacks, not really solving the problem. Another disadvantage of using ribbon stacks is that the rigid shape of the ribbon arrangement minimizes excess fiber length that may be stored within the buffer tubes. Excess fiber length is desirable in ADSS cables. For example, fibers with excess length may move freely when exposed to environmental stresses and/or when exposed to manipulations such as when pulled out of a closure for the preparation of fiber ends for joining, or for other installation or maintenance related activities. Ribbon designs that have diminished excess fiber length are thus disadvantageous.

ADSS cables with ribbon fibers also suffer from having a comparatively small strain-free window. The strain-free window refers to the amount of axial load that can be applied to a cable before more than negligible amounts of strain (>0.1%) are imparted to the optical fibers within the cable.

Generally, cables with ribbon fibers in buffer tubes have smaller strain-free windows than cables with loose fibers in buffer tubes. The ribbon fibers are more constrained and cannot move as freely to avoid absorbing the strain placed on the cable.

The '351 patent in its FIG. 3 indicates that a high fiber count ADSS cable using ribbon fibers can achieve negligible strain on the optical fibers at about 0.18% cable strain. Moreover, it states that fiber strain increases optical attenuation and that the ADSS ribbon cable can achieve negligible attenuation for fiber strain up to approximately 0.275%. While the '351 patent discusses "packing density" and "clearance" in buffer tubes to permit fiber movement, Applicants have observed that achieving low-fiber strain in an ADSS cable having ribbon cables also requires large amounts of aramid fibers as an outer strength member system to attain a high enough modulus of elasticity for the cable to protect the fibers from stresses.

Applicants have noticed that the existing approaches for high fiber count ADSS cables do not provide a desirable balance between a large number of optical fibers in a single layer self-supporting cable and low susceptibility to strain on the optical fibers. Therefore, Applicants have perceived the need to provide a high fiber count ADSS cable which does not present the drawbacks of high fiber count ADSS cables known in the art wherein ribbon fibers or, alternatively, at least two layers of buffer tubes are used.

SUMMARY

Applicants have found that the drawbacks mentioned above can be avoided, or at least remarkably reduced, by providing a high fiber count ADSS cable in which a single layer of bundled buffer tubes is used, the buffer tubes being designed to contain a high number of optical fibers (e.g. up to 72 optical fibers or even more) without negatively affecting the overall cable size. Therefore, in accordance with an aspect of the present invention, an all-dielectric self-supporting optical fiber cable comprises a central strength member, a plurality of buffer tubes, at least 288 bundled optical fibers contained in the buffer tubes, at least one outer strength member, and an outer jacket. The central strength member is longitudinally extending and dielectric. The buffer tubes are longitudinally extending and helically stranded in a single layer around the central strength member. The optical fibers are loosely arranged in bundles inside the buffer tubes. The at least one outer strength member is dielectric and extends around the single layer of buffer tubes. Preferably, the all-dielectric self-supporting optical fiber cable according to the present invention comprises up to 864 bundled optical fibers that are contained in the buffer tubes helically stranded in a single layer around the central strength member. More preferably, the all-dielectric self-supporting optical fiber cable according to the present invention comprises up to 432 bundled optical fibers.

In another aspect consistent with the present invention an optical fiber cable comprises a resin-based central strength member and a single layer of buffer tubes helically stranded around the central strength member in a reverse-oscillating lay. Each buffer tube contains a water-blocking material and optical fibers grouped into a plurality of bundles. The single layer of buffer tubes contains at least 288 optical fibers. Water-swellable tape surrounds the single layer of buffer tubes, and an inner jacket surrounds the water-swellable tape. Outer strength members are arranged exterior to the inner jacket, and an outer jacket forms the exterior of the cable. The optical fiber cable consists of dielectric materials and is self-supporting in an aerial installation.

With cables consistent with the present invention, the buffer tubes are stranded in an S-Z configuration with a lay length of less than about 220 millimeters. Moreover, cable elongation up to 0.55% under axial load results in less than 0.1% strain on the optical fibers.

It is to be understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate several embodiments of the invention, and together with the description, serve to explain the principles of the invention.

DETAILED DESCRIPTION

Reference will now be made in detail to embodiments consistent with the principles of the invention, examples of which are illustrated in the accompanying drawings. Wherever possible, the same reference numbers will be used throughout the drawings to refer to the same or like parts.

In accordance with an aspect of the present invention, an all-dielectric self-supporting optical fiber cable comprises a longitudinally extending, dielectric, central strength member; a plurality of longitudinally extending buffer tubes helically stranded in a single layer around the central strength member; at least 288 optical fibers loosely arranged inside the buffer tubes; an assembly of dielectric outer strength members extending around the single layer of buffer tubes; and an outer jacket surrounding the outer strength member.

Figure 4:
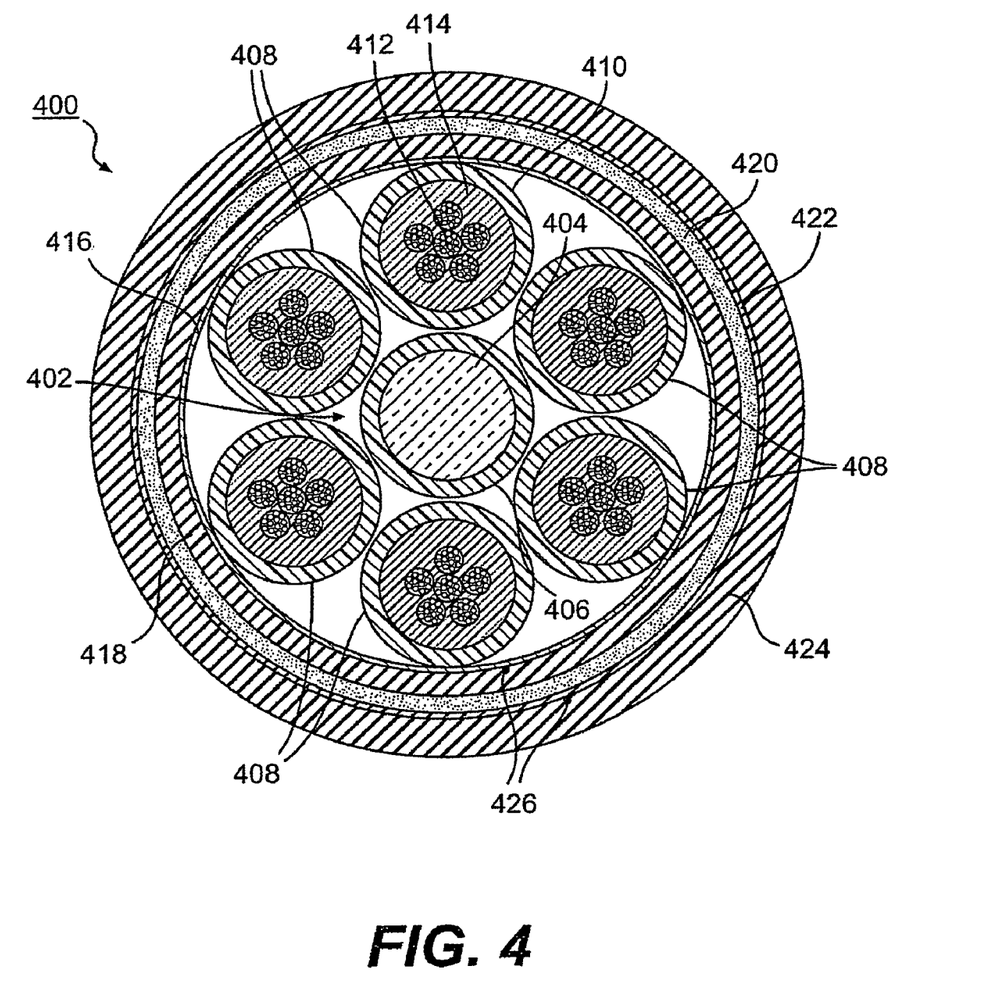
FIG. 4 is cross-sectional diagram of an ADSS cable having fiber bundles within a single layer of buffer tubes in accordance with one aspect of the present invention.

Generally referenced as 400 in FIG. 4, a cross-sectional diagram of an ADSS cable has a dielectric central strength member 402 along its axis. This central strength member 402 possesses substantial tensile and compressive strength and helps cable 400 resist thermal expansion and contraction. Preferably, the central strength member 402 comprises glass fiber and resin material 404. As an example, the central strength member may be made of Glass Reinforced Plastic (GRP). Additionally, central strength member 402 may be covered with an extruded polymeric coating 406, e.g. made from medium density polyethylene (MDPE). In one embodiment, central strength member 402 is a 5 mm diameter rod of Glass Reinforced Plastic (GRP) which is covered with a MDPE coating up to a final outer diameter of the central strength member 402 of about 6.25 mm.

A plurality of optical assemblies 408 surrounds central strength member 402. The optical assemblies each include a buffer tube 410 surrounding and loosely housing optical fiber bundles 412 within them. Preferably, buffer tube 410 contains 6 optical fiber bundles 412. Preferably, each optical fiber bundle 412 contains 12 optical fibers. Buffer tubes 410 may be made of plastic or other flexible materials substantially impervious to water. A suggested plastic material for buffer tubes 410 is a polyolefin selected from the group of polybutylene terephtalate (PBT), polyethylene (PE), polypropylene (PP), or combinations thereof. Preferably, buffer tubes 410 are made of high density polyethylene (HDPE). Preferably, buffer tubes 410 are uniquely distinguishable from each other, such as by using a different color for each buffer tube. For example, respective buffer tubes 410 may be colored blue, orange, green, brown, slate, and white, respectively, following industry customs.

Buffer tubes 410 preferably are extruded around a group of fiber bundles 412 in a known manner. The size of the buffer tubes may vary with the fiber capacity, and any suitable size of buffer tube may be used within the scope of the present invention. As an example, each buffer tube 410 has an outer diameter of 6.2 mm and an interior diameter of 4.8 mm. The number of buffer tubes in the single layer may also vary with fiber capacity. In. the particular example of FIG. 4, six longitudinally extended optical assemblies 408 surround central strength member 402.

Buffer tubes 410 are generally wrapped around central strength member 402 in a reverse helix or "S-Z" fashion. This stranding is also known as a reverse oscillating lay. The locations at which the stranded tubes reverse direction (e.g. from an "S" to a "Z") are referred to as reversal points. S-Z stranding of buffer tubes in general, and the reversal points in particular, facilitate accessing the optical fibers within the middle of the cable span and to allow branching of the cable to other optical paths. The S-Z stranding provides sufficient excess of tube length to make the tap easy by opening the side of the cable at a point along its length without losing the desired slack in the optical fibers within the tube that is opened. As one example, buffer tubes 410 are stranded over central strength member 402 using a 200 mm bend radius with a 220 mm lay length (preferably less than about 220 mm). A binder thread or threads may be contrahelically applied around buffer tubes to hold them in place.

Each optical assembly 408 in FIG. 4 also includes fiber bundles 412 within buffer tubes 410. Optical fibers within bundle 412 are any type of optical fiber waveguide known by those skilled in the art. A binder thread or tape (not shown) or similar device serves to separably hold the discrete optical fibers in close proximity. The binder thread may be helically applied to fiber bundle 412 with, for example, 100 mm lay length. The binder thread may be color-coded to distinguish one bundle 412 from other bundles in the same buffer tube, in a manner well known in the art. Alternatively, a colored plastic jacket (not shown) can be used to encase bundle 412. The jacket may be any plastic material and would preferably be made of polyvinyl chloride (PVC).

The number of fiber bundles 412 and the number of fibers within a bundle may vary depending on the particular application. FIG. 4, as an example, depicts each buffer tube 410 with six bundles of 12 fibers, giving each buffer tube a total of 72 optical fibers. With six buffer tubes, cable 400 has 432 fibers.

Water blocking material 414 may be inserted inside buffer tube 410 and around fiber bundles 412 to prevent water ingress and damage. For instance, the tubes may be flooded with a conventional thixotropic gel. The gel not only protects the fibers from water but also supports fiber bundles 412 within buffer tubes 410 to help insulate them from stresses imparted on the cable.

A conventional water-swellable tape 416 may be wrapped around the collection of optical assemblies 408 and extended longitudinally along the entire length of ADSS cable 400. For example, a 2.75 inch (about 70 mm) wide water-swellable tape may be applied over the single layer of buffer tubes 410, as shown in FIG. 4, and bound to them using, for example, a polypropylene binder. The tape may be, for example, a polymeric based tape that has on its surface a superabsorbent swellable material.

An inner jacket 418 may surround water-swellable tape 416. Inner jacket 418 may be formed by extruding a polymeric material around the water-swellable tape 416.

At least one outer strength member 420 is placed over inner jacket 418. Preferably, an assembly of outer strength member 420 is placed over inner jacket 418. Outer strength members 420 may include multiple strands of material having high tensile strength. The members 420, together with central strength member 402, help to increase the modulus of elasticity of the overall cable 400 and minimize strain on the optical fibers within buffer tubes 410. Typically, strength members 420 are aramid strands or glass threads. A first half of the strands may be wrapped in a clockwise direction around the inner jacket 418. The second half of the strands in the outer strength member assembly 420 may be wrapped in a counter-clockwise direction around the inner jacket. As an example, the outer strength member assembly 420 includes 25 ends of 8050 Dtex aramid yarns.

A barrier tape 422 may be applied on top of the outer strength member assembly 420. Barrier tape 422 may be a water-swellable tape. For example, a 3.25 inch (about 83 mm) wide water-swellable tape may be used. Tape 422 provides additional protection for the optical fibers from potential water ingress and migration in the cable 400. A polyester binder thread or other mechanism may help retain the water-swellable tape 422 against the cable.

An outer jacket 424 forms the exterior of cable 400. Jacket 424 may be formed by extruding a polymeric material around barrier tape 422. A pair of rip cords 426 may be applied beneath the outer jacket 424 to provide access to internal compounds of the ADSS cable, for example, during a field application.

As illustrated by ADSS cable 400 in FIG. 4, high fiber count may be achieved in an ADSS cable with only a single layer of buffer tubes. In this example, if each buffer tube 410 holds six 12-fiber bundles, the illustrated ADSS cable 400 will have a total of 432 optical fibers.

Applicants have constructed cable 400 and verified that its performance passes the test requirements of Telcordia GR-20, Issue 2 and IEEE Std 1222-2004. Those tests include temperature cycling, cable aging, cable cyclic flexing, cable twist, compressive strength, impact resistance, water penetration, sheave, and stress/strain.

Unlike a high-fiber count ADSS cable using two layers of buffer tubes as in FIG. 2, the high-fiber count cable of FIG. 4 provides a self-supporting design that avoids the potential for crushing of optical fibers in an internal layer of buffer tubes. The cable consistent with the present invention also avoids the potential for decoupling of the buffer tube layers after installation due to high frequency vibrations.

Figure 5:
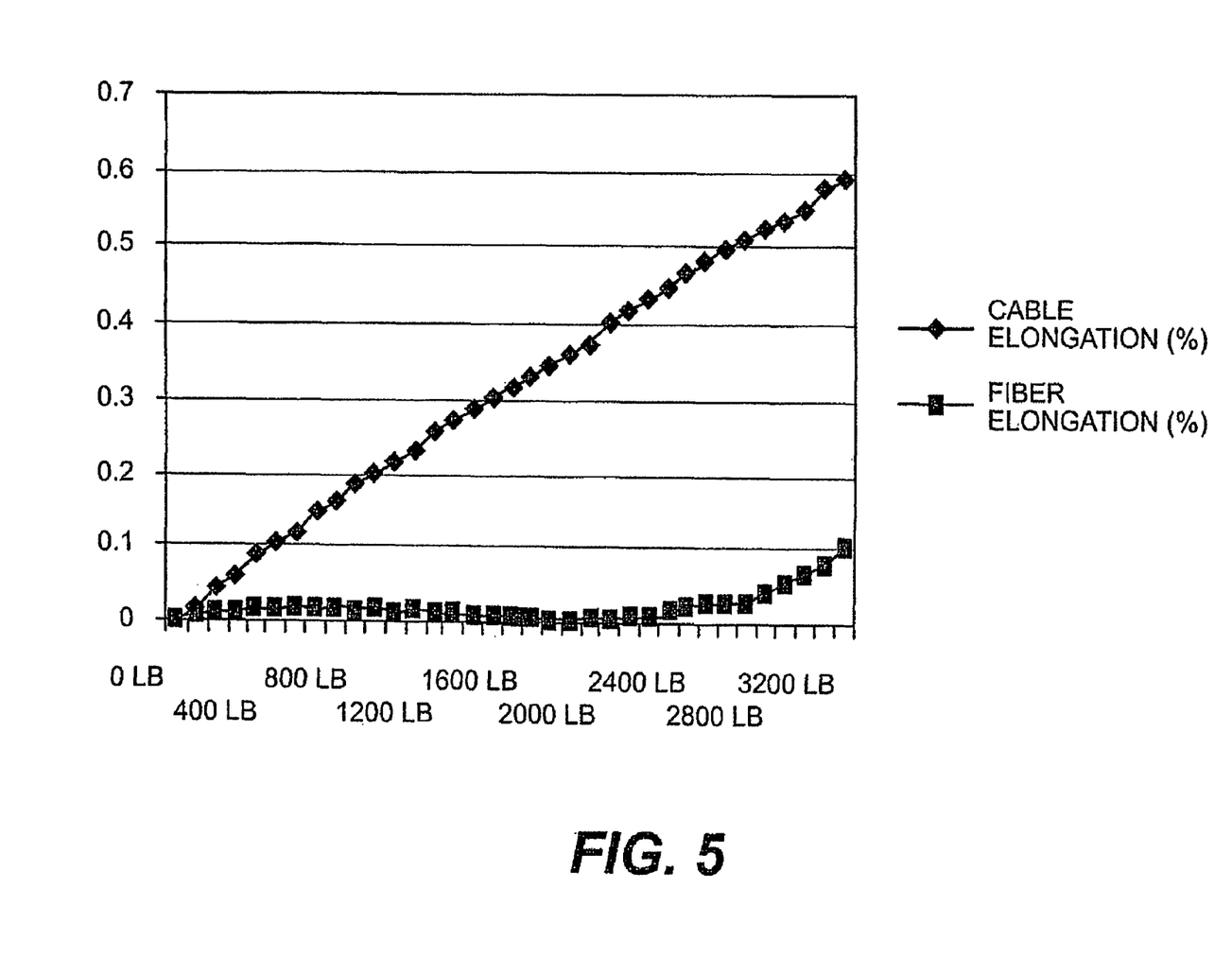
FIG. 5 is a graph of cable and fiber elongation under a range of axial loads for the ADSS cable depicted in FIG. 4.

Unlike a high-fiber count ADSS cable using ribbon fibers as in FIG. 3, the high-fiber count cable of FIG. 4 provides a large strain-free window to minimize the risk of signal attenuation in a self-supporting installation. FIG. 5 is a graph showing the amount of elongation for the cable and fibers, respectively, of FIG. 4 for various axial loads. As shown in FIG. 5, cable 400 has a strain-free window of about 0.55-0.60%, i.e., the cable can elongate up to about 0.55-0.60% (at nearly 3200 lbs) before the optical fibers stretch 0.1%. FIG. 3 of the '351 patent shows that the strain-free window for an ADSS cable having ribbon fibers is only about 0.18-0.2%, i.e. the cable can elongate up to about 0.18-0.2% (at 600 lbs) before the optical fibers stretch 0.1%. The cable of FIG. 4 achieves the low strain performance without having to include excessive amounts of aramid strength members. For example, using the cable of FIG. 4 as an example, it would take approximately one hundred 8050 Dtex aramid yarns to limit the cable elongation to 0.2% at an applied axial load of 3200 lb. This is an increase of approximately 75 yarns over the number that, according to the present invention, is found to be sufficient to provide strain free operation of the FIG. 4 cable using bundled fibers.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An all-dielectric self-supporting optical fiber cable, comprising:
   a longitudinally extending, dielectric, central strength member;
   a plurality of longitudinally extending buffer tubes helically stranded in a single layer around the central strength member with a lay length not higher than 220 mm;
   more than 288 optical fibers bound together as bundles with color-coded thread inside the single layer of buffer tubes;
   an inner polymeric jacket extending around the single layer of buffer tubes;
   at least one dielectric outer strength member positioned around the inner jacket and, together with the central strength member, increasing the modulus of elasticity of the all-dielectric self-supporting optical fiber cable, the outer strength member including multiple strands of material having high tensile strength, wherein a first half of the strands is wrapped in a clockwise direction around the inner jacket and the second half of the strands is wrapped in a counter-clockwise direction around the inner jacket; and
   an outer jacket surrounding the outer strength member,
   wherein the optical fiber cable is self-supporting in an aerial installation.

2. The all-dielectric self-supporting cable of claim 1, wherein elongation of the cable of up to 0.55% under axial load results in less than 0.1% strain on the optical fibers.

3. The all-dielectric self-supporting cable of claim 1, wherein the buffer tubes are stranded in an S-Z configuration.

4. The all-dielectric self-supporting cable of claim 1, wherein at least 432 optical fibers are bundled inside the buffer tubes.

5. The all-dielectric self-supporting cable of claim 4, wherein at least 864 optical fibers are bundled inside the buffer tubes.

6. The all-dielectric self-supporting cable of claim 1, further comprising a water-swellable tape positioned between the at least one outer strength member and the outer jacket.

7. The all-dielectric self-supporting cable of claim 1, further comprising water-blocking material within the plurality of buffer tubes.

8. An optical fiber cable, comprising:
   a central strength member;
   a single layer of buffer tubes helically stranded around the central strength member in a reverse-oscillating lay with a lay length not higher than 220 mm, each buffer tube containing optical fibers grouped into a plurality of bundles with color-coded thread, the single layer of buffer tubes containing more than 288 optical fibers;
   an inner polymeric jacket extending around the single layer of buffer tubes;
   at least one outer strength member positioned around the inner jacket and, together with the central strength member, increasing the modulus of elasticity of the optical fiber cable, the outer strength member including multiple strands of material having high tensile strength, wherein a first half of the strands is wrapped in a clockwise direction around the inner jacket and the second half of the strands is wrapped in a counter-clockwise direction around the inner jacket; and
   an outer jacket in a radial outer position with respect to said at least one outer strength member,
   wherein the optical fiber cable consists of dielectric materials and is self-supporting in an aerial installation.

9. The cable of claim 8, wherein at least 432 optical fibers are bundled inside the buffer tubes.

10. The cable of claim 9, wherein at least 864 optical fibers are bundled inside the buffer tubes.

11. The cable of claim 8, wherein elongation of the cable of up to 0.55% under axial load results in less than 0.1% strain on the optical fibers.

12. The cable of claim 8, wherein the buffer tubes are stranded in an S-Z configuration.

13. The cable of claim 8, wherein the central strength member is made of a resin material.

14. The cable of claim 8, wherein each buffer tube contains a water-blocking material.

15. The cable of claim 8, further comprising a water-swellable tape surrounding the single layer of buffer tubes.

* * * * *